United States Patent
Salvo et al.

(10) Patent No.: US 6,341,271 B1
(45) Date of Patent: Jan. 22, 2002

(54) INVENTORY MANAGEMENT SYSTEM AND METHOD

(75) Inventors: Joseph James Salvo, Schenectady; Patricia Denise Mackenzie, Clifton Park; Janet Sue Bennett, Scotia; Heather Ann Relyea, Niskayuna; Thomas Anthony Morelli, II, Stephentown, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/191,910

(22) Filed: Nov. 13, 1998

(51) Int. Cl.[7] ............................................. G06F 17/60
(52) U.S. Cl. ....................................................... 705/28
(58) Field of Search ....................................... 705/28, 8

(56) References Cited

U.S. PATENT DOCUMENTS

| | | | |
|---|---|---|---|
| 4,831,565 A | | 5/1989 | Woodward |
| 5,038,283 A | | 8/1991 | Caveney |
| 5,154,314 A | | 10/1992 | Van Wormer |
| 5,237,496 A | | 8/1993 | Kagami et al. |
| 5,400,253 A | | 3/1995 | O'Connor |
| 5,537,313 A | | 7/1996 | Pirelli |
| 5,596,493 A | | 1/1997 | Tone et al. |
| 5,608,621 A | | 3/1997 | Caveney et al. |
| 5,638,519 A | | 6/1997 | Haluska |
| 5,654,508 A | * | 8/1997 | Gibbs ............................. 73/599 |
| 5,712,989 A | * | 1/1998 | Johnson et al. ................ 705/28 |
| 5,765,143 A | | 6/1998 | Sheldon et al. |
| 5,777,884 A | * | 7/1998 | Belka et al. ............. 364/478.13 |
| 5,819,232 A | * | 10/1998 | Shipman ......................... 705/8 |
| 5,930,771 A | * | 7/1999 | Stapp .............................. 705/28 |
| 5,946,662 A | * | 8/1999 | Ettl et al. ......................... 705/8 |
| 5,950,206 A | * | 9/1999 | Krause ........................ 707/104 |
| 6,002,344 A | * | 12/1999 | Bandy et al. ............. 340/825.54 |
| 6,012,041 A | * | 1/2000 | Brewer et al. ................ 705/28 |
| 6,026,378 A | * | 2/2000 | Onozaki ......................... 705/28 |
| 6,078,900 A | * | 6/2000 | Ettl et al. ....................... 705/28 |

FOREIGN PATENT DOCUMENTS

| | | | | |
|---|---|---|---|---|
| JP | 10-249678 | * | 3/1997 | ............. G06F/1/21 |
| JP | 11-254275 | * | 3/1998 | ........... G06F/17/60 |
| WO | 9740459 | | 10/1997 | |
| WO | WO-9740459 | * | 10/1997 | ........... G06F/17/60 |

OTHER PUBLICATIONS

Modern Material Handling—Applicastion Case Histories.*
AT&T Plant Gears For Just–In–Time Control—Communications News v27 n11 p28 Nov.90.*
Computergram International Sep. 4, 1992 CGI09040015.*
"Rethinking Inventory"—Electrical Wholesaling, Apr. 1994 (http://www.ewweb.com/articles/ec16.htm).
"VMI"—Electrical Wholesaling, Mar. 1995 (http:www.ewweb.com/articles/ec7.htm).

(List continued on next page.)

*Primary Examiner*—Vincent Millin
*Assistant Examiner*—Geoffrey Akers
(74) *Attorney, Agent, or Firm*—Toan P. Vo; Noreen C. Johnson

(57) ABSTRACT

An inventory management system automatically monitors inventory amounts, provides information concerning inventory, and decides if an order for replacement inventory should be placed. The system includes a storage for inventory, an indicator for monitoring and reporting the level of current inventory, and a controller for receiving information from different inventory suppliers and for integrating such information with information on current inventory amounts and estimated future use to decide if an order for replacing inventory should be made. An order is placed automatically to a supplier and the progress for the delivery of replacement inventory is automatically monitored. A method using this system for managing inventory includes the steps of automatic gathering information about the current inventory and deciding whether and when replacement inventory should be ordered.

71 Claims, 3 Drawing Sheets

OTHER PUBLICATIONS

"VMI Update"—Electrical Wholesaling, Feb. 1996 (http://www.ewweb.com/articles/ec5.htm).

"The Computers of Commerce"—Electrical Wholesaling, Feb. 1997 (http://www.ewweb.com/articles/297sys.htm).

"VMI: Not just another fad"—Industrial Distribution, Jun. 1997 (http://www.manufacturing.net/magazine/id/archives/1997/ind0601.97/06vmi.htm).

"Taming the Inventory Tiger"—The Idea Logical Company, Jan. 29, 1998 (http:www.idealog.com/vmispeak.htm).

"WEB VMI Online Brochure"—Oct. 6,1998 (http://scimonitoring.com/services/webvmi/webvmi.htm).

"Remote Monitoring of Tank and Process Conditions for Chemical Producct Users and Suppliers"—Oct. 15, 1998 http://(www.remotepossibilities.com/ap_tank.htm).

* cited by examiner

INVENTORY MANAGEMENT SYSTEM AND METHOD

BACKGROUND OF THE INVENTION

The invention is related to inventory management systems and methods. In particular, the invention is related to vendor-managed inventory systems and methods.

Prior inventory management systems and methods involved a large number of manually conducted tasks. These systems were labor intensive. Also, the manual steps often led to errors in the system's results. For example, amounts of inventory of storage containers were determined by sight, dip sticks, and "yo-yo" level sensors. A "yo-yo" sensor is one in which a weight is lowered until it reached a top level of material in the silo, and the distance the sensor is lowered is measured to determine a storage container amount. The determined amount is then evaluated to ascertain if more inventory is needed and will fit in the silo. These methods provided inaccurate measurements of the storage containers amounts. Throughout the processes, time delays are common and inevitable. Also, the material in the silo is being used and the amount is not known. Using these methods an accurate, real-time inventory level was not achieved.

The determined amount, which in most instances is not the real-time exact amount due to time delays, is reported to a purchasing agent. The purchasing agent determines if an order should be placed and when it should be placed. The purchasing agent then contacts a vendor to determine if the vendor has inventory available. If some inventory is available from that vendor, the purchasing agent then places an order that will be filled in due course. The order is placed probably without regard to current market costs, transportation costs, and other peripheral costs, since the inventory is needed to maintain the manufacturing site operation. If the vendor does not have that inventory, the purchasing agent must find a vendor who has that inventory in stock, and may buy from the first vendor with available inventory, again regardless of cost.

The order is filled and then transported to the silo, for example by truck or rail. Often the location of the order during transport, its route, potential delays, and other transportation factors are unknown to the purchasing agent and vendor. Accordingly, an exact inventory arrival time is not known and delays cannot be prevented. Further, throughout this entire process, the inventory in the silo is being used and the order may not be enough to replenish the silo. Therefore, the order may not meet the needs of the manufacturing site, and operation of the site may be reduced while waiting for the order.

Another deficiency, with the above-stated inventory systems, is that the inventory management process does not account for historical, trend operational variations, or provide available information on future changes at the manufacturing site. For example, a site may increase its operation in the middle of the week, using a quarter of a silo daily on Tuesday, Wednesday and Thursday, and only an eighth of a silo on Monday and Friday. Without knowledge of this historic trend, an amount of three-quarters full on Monday morning may not cause a purchasing agent to place an inventory order, even for the middle of the week. The purchasing agent may look at Monday's one-eighth silo use, and determine that no order is needed since one-eighth silo use over five days will still leave inventory in the silo, and keep total costs low. Thus, a silo reading on Monday is inadequate for determining inventory and use needs for the remainder of a week. Also, if an increase in product produced from the inventory is needed to meet a customer's order, this information must be expressly communicated from manufacturing site plant management to the purchasing agent so that appropriate inventory amounts are available. The lack of an order placed by a purchasing agent may cause manufacturing site operation to be reduced, and possibly halted, which is highly undesirable and inefficient.

Attempts to automate ordering processes have been attempted, however these automated processes have drawbacks. For example, an automatic standing inventory order for a given day may be in place, without regard for the actual, real-time inventory needs. If the manufacturing site has been in a slow-down, such as for process overhauls, the silo inventory may not need replenishing. The order arrives and the silo cannot accept the additional inventory. The inventory is returned to the vendor, if they will accept a return, and the vendor loses money on the sale. In business, a vendor will accept few, if any, returns of ordered inventory. Alternatively, the ordered inventory stays at the manufacturing site in a transport vehicle, and is unused for some period of time. The orderer then incurs costs of storing the un-used inventory, rental of the transport vehicle for as long as the inventory cannot be unloaded, and un-sold material stored at the manufacturing site, which is un-economical and undesirable.

Automated computer managed inventory systems have been proposed to overcome some of the above-noted shortcomings. In one proposed system, an inventory system determines amounts and past usage in tanks to schedule, orders replenishing material, and directs a fleet of tank trucks. The system does not provide any comparative pricing and purchasing abilities to minimize inventory management costs.

Another system relies upon web-based technology to assist in providing status of liquid material in tanks. This system does not provide comparative pricing and purchasing ability for minimizing costs. Also, the system is not believed to provide for historical and anticipated future trend analysis. Accordingly, this system may not provide a low cost price for the material and does not assist in anticipating inventory needs.

Therefore, a system, which provides real-time inventory management of supply at a site, including comparative pricing and purchasing abilities, would be desirable. Further, a system that provides an ability to interact and send information to a vendor's manufacturing schedule, forecast possible manufacturing based on historical, estimated future, or market data and indicators; and provide a display of data in a useful format to a vendor, customer, manufacturer, and others that desire the information, would be useful. An automated vendor managed inventory system of this nature would permit lowest total cost purchasing, ordering, and delivery of inventory.

SUMMARY OF THE INVENTION

Accordingly, a system and method for inventory management, in particular, vendor-managed inventory, are provided. The system and method provide information concerning inventory amounts and inventory ordering to a manufacturing site and an inventory vendor. The system comprises at least one storage receptacle that stores inventory; at least one amount indicator that determines an inventory amount in each receptacle, each amount indicator generating inventory amount signals representative of inventory amounts in the receptacle; at least one inventory price source that provides inventory price information; and a control unit that receives the inventory amount signals from the amount indicator and inventory price information from the inventory price source. The control unit analyzes the inventory amount signals to determine amounts in the receptacle. The control unit also analyzes the amounts and inventory price information, and uses this information to determine if an inventory order should be placed.

The inventory management method information concerning inventory amounts and inventory ordering to a manufacturing site, an inventory vendor, or both. The method comprises the steps of determining an inventory amount in each receptacle; generating signals representative of inventory amounts; providing inventory price information from at least one inventory price source; receiving inventory amount signals; receiving inventory price information from the inventory price source; analyzing inventory amount signals and inventory price information; determining if an inventory order should be placed based on the analyzed inventory amounts and inventory price information; and providing information concerning an inventory order in an accessible form to at least one of a manufacturing site and an inventory vendor.

These and other aspects, advantages and salient features of the invention will become apparent from the following detailed description, which, when taken in conjunction with the annexed drawings, where like parts are designated by like reference characters throughout the drawings, disclose embodiments of the invention.

DESCRIPTION OF THE INVENTION

The inventory management system and method, as embodied by the invention, permit monitoring and determining real-time inventory status of one or more storage receptacles, such as silos at a manufacturing site, automatic ordering of inventory to replenish the receptacles at a low price, and purchasing the inventory at a lowest possible price. The inventory monitoring permits historical analysis of inventory use, evaluation of inventory usage, automation and suggestions for a vendor's (also known as a supplier) manufacturing schedule to meet the needs of a manufacturing site's schedule. The inventory monitoring also permits prediction of estimated future inventory usage, lot identification, forecasting based on trends and economic indicators, automatic notification of inventory occurrences that require attention, and automation of inventory ordering. The inventory ordering, as embodied by the invention, considers many factors, including, but not limited to, historical inventory usage trends, real-time needs, economic models, pricing models, information concerning estimated future needs and changes, inventory supply time, and comparative pricing and purchasing ability.

The inventory management system comprises a monitoring arrangement at a manufacturing site and a control that interacts with the monitoring arrangement. The control also interacts with inventory price sources, shipping information sources, vendor manufacturing schedules, and an inventory tracking device, such as, but not limited to, a global positioning system (GPS).

Figure 1:
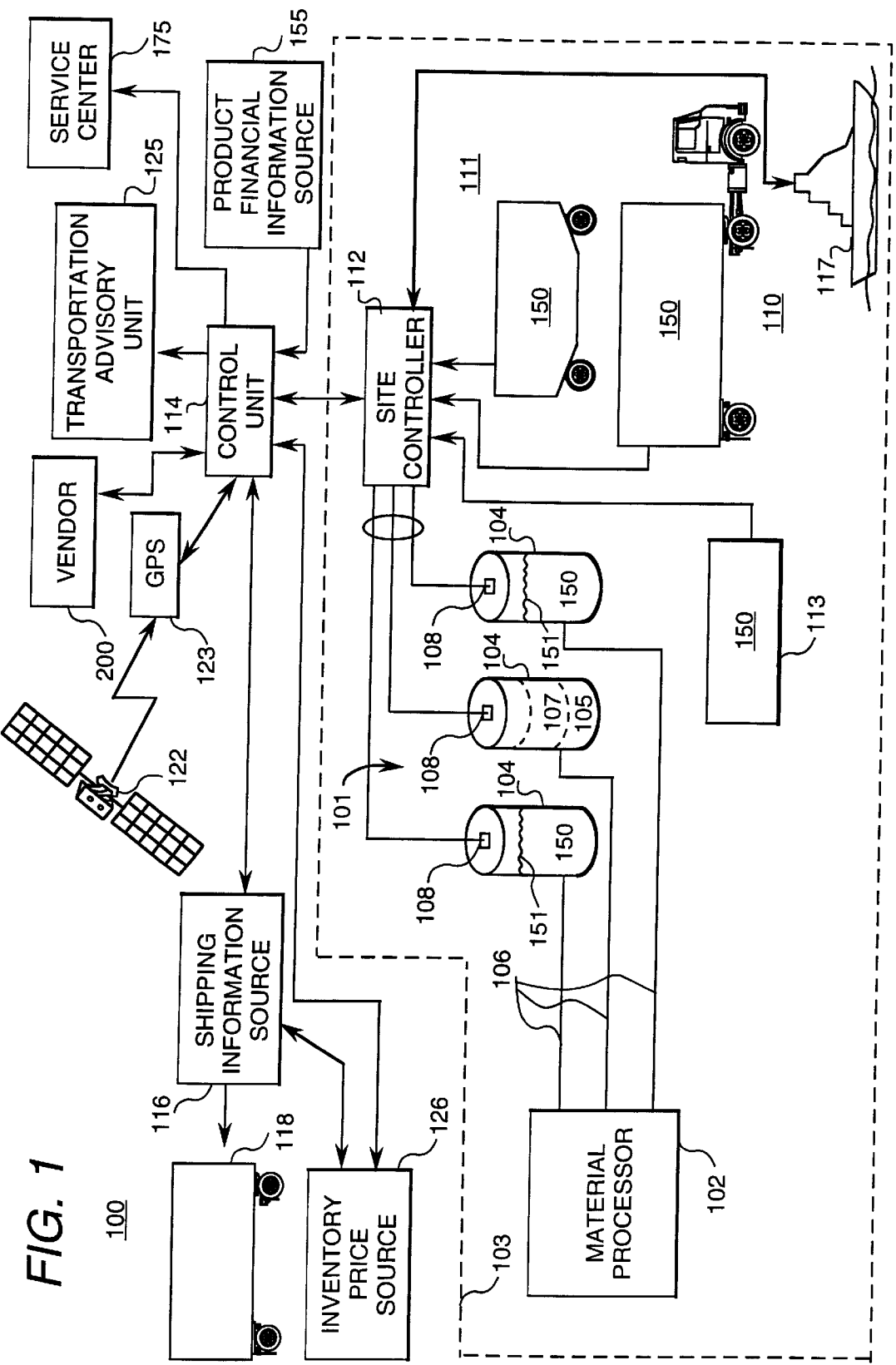
FIG. 1 is a schematic primarily block diagram of an inventory management system.

The inventory management system 100, as embodied by the invention, is schematically illustrated in FIG. 1. The inventory management system 100 comprises a monitoring arrangement 101 at a manufacturing site 103. The manufacturing site 103 comprises at least one inventory processor 102 that forms a product from the inventory 150. The inventory processor 102 includes, but is not limited to, an extruder, an injection molder, a die cast device, and other inventory consuming device.

Inventory 150 is stored in a plurality of receptacles 104 at the manufacturing site 103. The receptacles comprise any appropriate storage device, such as, but not limited to, a silo, storage bin, hopper, and bag, and combinations thereof. The shape and material of each receptacle may differ and do not affect the operation of the inventory management system 100. The description of the invention refers to a receptacle, however this is not meant to limit the invention in any way, and the description covers other inventory storage devices as well.

Each receptacle 104 is connected to the processor 102 by inventory supply lines 106. The inventory supply lines 106 deliver the inventory 150 to the processor 102 so the inventory 150 may be processed and formed into an appropriate article. The inventory supply lines 106 comprise any means for transporting inventory 150. Therefore, the inventory supply lines 106 may include, but are not limited to, pneumatic lines, screw conveyors, belt conveyors, bucket conveyors, and vibratory lines.

Each receptacle comprises an amount indicator 108 that provides signals indicative of an inventory amount 151. The amount indicator 108 is illustrated as disposed at the top of the receptacles, however this arrangement is merely for illustration. The position of the indicator 108 may be anywhere in communication with the inventory amount 151. The scope of the invention further includes an indicator 108 that comprises a level sensor, a weight indicator, a volume analyzer, and other devices that permit determination of the amount 151 of inventory 150 in a receptacle 104. Further, the indicator 108 may also measure amount influencing variables, such as, humidity and temperature. These indicators are merely exemplary, and are not meant to limit the scope of the invention in any way.

Exemplary indicators include ultrasonic and ultrasound level detectors, optical sensors, laser amount sensing detectors, nuclear amount sensing detectors, load (weight) cells, and other devices capable of detecting amounts. Ultrasound detectors enable accurate receptacle inventory amount determination, even if there are voids in the receptacle, such as those voids that result from clumping and coagulating of the inventory 150. If a weight sensor is used to determine the amount in a receptacle, a tare weight of the receptacle is subtracted from a gross weight of the receptacle to determine the net weight. The volume of the inventory 150 can be determined by dividing the gross weight by the inventory's density.

The indicators 108 send signals indicative of the inventory amount 151 to a site controller 112. The site controller 112 is connected to receive signals from inventory storage receptacles and on-site inventory areas. These on-site storage areas, which contain inventory 150 and include a sensor 108 as needed, may include, a warehouse 113 and on-site transport vehicles, for example a rail car 111, vessel 117, and a truck 110, that have delivered inventory 150 to the manufacturing site 103.

The on-site storage areas and receptacles transmit their amount signals to the site controller 112. Thus, the site controller 112 receives inventory amount signals from each on-site storage device. The site controller 112 forwards these signals over time to the control unit 114, as the processor 102 forms articles from the inventory 150 and the amounts within the receptacles 104 drop. Accordingly, the control unit 114 determines the amount of inventory used over time, can estimate future use, and determine if an inventory order is needed.

The signals transmitted in the inventory management system 100 are typically sent over hardwired connections, for example cables, connectors, dedicated phone lines, fiber-optic lines, and similar hardwired connections. Alternatively, the signals may be sent by wireless connections, including but not limited to, wired and wireless Ethernet signals, radio signals, short-wave signals, wired and wireless Internet and web signals, and other wireless connections. Signals are sent from and received by the control unit 114.

The site controller 112 typically comprises a solid state signal processor and is connected to a control unit 114 to receive signals from the site controller 112. The signals received by the site controller 112 are indicative of the inventory amount 151 in each receptacle and storage area, for example, the warehouse 113 and on-site transport vehicles. The signals from the site controller 112 to the control unit 114 comprise signals sent by at least one of hardwired connections and wireless connections, as discussed above.

The control unit 114 is programmed to operate, and alternatively comprises software, for data acquisition, data mining, and analysis software, that enable inventory management analysis and decisions to be made. The control unit 114 comprises any appropriate high-powered solid-state switching device. As illustrated, the control unit 114 is represented as a computer, however, this is merely exemplary of an appropriate high-powered control, within the scope of the invention. For example, but not limiting of the invention, the control unit 114 comprises at least one of a silicon controlled rectifier (SCR), a thyristor, MOS-controlled thyristor (MCT) and an insulated gate bipolar transistor. In the illustrated exemplary embodiment, the control is implemented as a single special purpose integrated circuit, such as Application Specific Integrated Circuit (ASIC), having a main or central processor section for overall, system-level control, and separate sections dedicated to performing various different specific combinations, functions and other processes under control of the central processor section. It will be appreciated by those skilled in the art that the control can also be implemented using a variety of separate dedicated or programmable integrated or other electronic circuits or devices. These devices include hardwired electronic or logic circuits including discrete element circuits or programmable logic devices. The logic devices comprise Programmable Logic Devices (PLDs), Programmable Analytical Devices (PALs), Programmable Logic Applications (PLAs), or the like. The control unit 114 can also be implemented using a suitably programmed general-purpose computer, such as a microprocessor or microcontrol, or other processor device, such as a Central Processing Unit (CPU) or Main Processing Unit (MPU), either alone or in conjunction with one or more peripheral data and signal processing devices.

In general, any device on which a finite state machine resides that is capable of implementing the flow charts, as illustrated in the application, can be used as the control unit 114. As shown, a distributed processing architecture provides enhanced data/signal processing capability and speed for the control unit 114. The control unit 114 may also incorporate a "JAVA" virtual machine that links a server through the Internet for communication purposes (described hereinafter).

The control unit 114 is connected to an inventory price source 126, which is able to determine the lowest available price for the inventory 150. The connection is made by any appropriate means, such as, but not limited to, wireless and hardwired connections, as discussed above. An Internet based connection permits real-time, instantaneous price information to be obtained by the control unit 114. The inventory price source comprises at least one of economic indicators, economic models, commodity pricing indexes, spot market pricing, Dow Jones™ information, other market information, and other inventory price sources. The control unit 114 stores and analyzes historical trends of inventory prices to determine analyzed inventory price trends. Accordingly, the control unit 114 analyzes information and determines when an inventory price is close to historical high, low, or average prices. The control unit 114 provides information concerning opportune times to purchase inventory based on price. Accordingly, the system 100 does not rely upon a previously used inventory vendor, but can buy inventory from a low priced inventory vendor based on real-time inventory prices.

The control unit 114 is also connected to shipping information sources 116. The connection to shipping information sources 116 is achieved by at least one of hardwired and wireless communications, including Internet communication and others as discussed above. The shipping information sources 116 provide the control unit 114 with information for analyzing inventory avail ability, and the types and costs of transporting the inventory 150 from a vendor to the manufacturing site 103. The shipping information includes, but is not limited to, tariffs, taxes, types and sizes of available shipping from the vendor 200 and outside shippers, and other costs associated with shipping the inventory 150 from the vendor 200 to the manufacturing site 103. The shipping information sources 116 also provide the control unit 114 with transport data for analyzing, including time needed for delivery from the vendor to the manufacturing site 103, size and type of shipping vehicles available, and restrictions on shipping, especially if the inventory may be considered hazardous or perishable.

Therefore, the control unit 114 is provided with information for analyzing inventory purchase prices from different vendors and transportation-associated costs from a vendor. With such information, the control unit 114 analyzes and determines a lowest total inventory purchase price vendor (low price vendor) for the inventory, where the total inventory purchase price determination includes actual vendor inventory prices and transportation-associated costs. Without factoring in both inventory prices and transportation-associated costs, an inventory with a low inventory price may be purchased, however it may have high transportation costs. Therefore, its total inventory purchase price is higher than an inventory with a higher price, but with lower transportation-associated costs. Thus, a lower total inventory purchase price may be realized with a higher priced inventory.

A global positioning system (GPS) 123 is also connectable to the control unit 114. The GPS enables real-time, instantaneous determination of an inventory order location while enroute to the manufacturing site 103. The GPS 123 transmits information concerning an inventory order location, for example the GPS relies on a satellite system 122 that receives signals from a transport vehicle 118, for example from transponders. Accordingly, the control unit 114 with information from the GPS determines an exact location of the inventory order and transport vehicle 118.

The control unit 114 is also connectable to a transportation advisory unit 125. The transportation advisory unit 125 provides advisory information concerning road conditions, rail conditions, water conditions, existing and possible delays, construction along possible routes, weather information that may affect the shipment, and other transportation affecting factors. The information from the transportation advisory unit 125 to the control unit 114 comprise signals sent by at least one of hardwired connections and wireless connections, as discussed above. With this transportation advisory information and the instant location of the transport vehicle available from the GPS 123, the control unit 114 analyzes information and advises the transport vehicle 118, for example through appropriate communications links including but not limited to, radio communications, of the quickest, most delay free route to follow to the manufacturing site 103.

The information from the above sources is sent to the control unit 114, in which it is analyzed to provide analyzed information of inventory prices, vendor prices, transportation costs, shipping information, and total inventory purchase prices (hereinafter "analyzed information"). The analyzed information is accessible by a manufacturing site's plant management and purchasing agent (hereinafter "plant management") to provide them with useful information concerning inventory costs. The plant management obtains the analyzed information in an end form, without seeing the raw data that has been analyzed. Plant management can alter schedules based on the analyzed information, including usage rates and forecast information. Accordingly, plant management does not see, or is concerned with, the processes used by the control unit 114 to analyze the information, and merely obtains the analyzed information.

The analyzed information sent by the control unit 114 is typically provided to a vendor 200 who makes inventory. The vendor 200 is able to schedule manufacture of inventory 150 in order to meet the demands of the manufacturing site 103. For example, if a manufacturing site 103 will increase production in ten days, the vendor 200 will be able to determine this increased production from the inventory management system 100, and will provide increased amounts of inventory 150 to meet the requirements of the manufacturing site 103. The vendor 200 may be unable to meet the increased production demands of the manufacturing site 103 if not for possessing analyzed information from the inventory management system 100. The analyzed information between the vendor 200 and the control unit 114 comprises signals sent by at least one of hardwired connections and wireless connections, as discussed above.

The analyzed information from the control unit 114 is typically accessible anywhere and any time, for example by phone, voice mail, fax, overnight and regular mail, courier, and over the Internet. If the information is sent over the Internet, the analyzed information is available by simply connecting to an appropriate web site, where the analyzed information is presented and updated instantaneously, or as appropriate. The web site can be password protected, so that access to the analyzed information remains to those who have a need to know. Thus real-time information, analyzed information, historical trend information, records of prices, inventory usage, shipment location, and other inventory related information is available to those who need the information. The analyzed information provides plant management and vendors with reliable, statistically based recommendations for inventory decisions, manufacturing schedules, and other manufacturing related needs.

The control unit 114 is also able to provide financial information concerning a product produced by the processor 102, thus providing another inventory management system 100 benefit. This information is obtained over appropriate communication lines from product financial information sources 155, and is accessible by plant management from the inventory management system 100. For example, and not meant to limit the invention in any way, if the processor 102 produces plastic pellets, the control unit 114 can access commodity markets to provide pricing information concerning plastic pellets. An alert can be generated by the control unit 114 if a pellet price is within a price range designated by plant management, and alternatively by an economic model, as a desirable (premium) price to sell the pellets. Therefore, the inventory management system 100, as embodied by the invention, determines a real-time premium price for the vendor's product, and alerts plant management so sales can be made. The ability of the inventory management system 100 to provide real-time pricing information for both inventory and its resultant product, provides means for optimizing profits from a manufacturing site 103.

Another inventory management system 100 benefit arises from analyzed information from the control unit 114 that can be monitored by a service center 175. The service center 175 provides customer service, and monitors analyzed information and can perform further evaluation of the analyzed information, as needed. For example, the analyzed information can be further evaluated for quantifying inventory trends.

A further inventory management system 100 benefit arises from the control unit 114, and alternatively the service center 175, applying analytical tools to the analyzed information, such as, but not limited to, tools for evaluating inventory variations through statistical analysis, design of experiment methodology and quality control tools. The statistical analysis determines process capability, possible errors, and effectiveness of an individual feature's performance. The statistical analysis also determines sources of delays in the inventory ordering, such as delays due to a vendor, transportation, and ordering. The statistical analysis of information relies upon known information measurement and analysis procedures, such as, but not limited to, those described in *Six Sigma Productivity Analysis and Process Characterization*, Mikel J. Harry and J. Ronald Lawson. Addison-Wesley Publishing Co., 1992.

The control unit 114 and the service center 175 can send alerts to plant management at the manufacturing site and vendors (if desired), if a "critical" event, such as but not limited to, extreme shortages in inventory, very low or high inventory prices, and changes in economic indicators occur. The alerts are sent automatically by the control unit 114, and may also be sent manually by the service center 175. The alerts are sent by any appropriate communication mode, such as regular mail, e-mail, telephone call, pagers, facsimile, Internet messages, and similar communications.

The control unit 114 applies predictive engineering tools to the analyzed inventory information that will assist plant management in developing transfer functions concerning inventory management for another inventory management system 100 benefit. The transfer functions are used to enhance set-up of the inventory management system 100, and to further monitor and modify, if needed, its performance. The transfer functions are developed through analysis of inventory usage, vendor information, shipping information, critical to quality (CTQ) variables, and other variables in the inventory management system. For example, the transfer functions for the inventory management system 100, as embodied by the invention, can be developed through design-of-experiments (DOEs).

The real-time inventory status is available without the errors and delays associated with manual level readings, determination of volume, calculation of inventory trends including price and usage, and determination of inventory order appropriateness. Also, the control unit 114, including its pricing software, is able to determine a lowest total inventory purchase price for inventory and times for inventory to be delivered to the manufacturing site 103, in order to maintain operations at the manufacturing site 103. Therefore, efficiency of the purchasing process is enhanced, and cost savings will be evident.

The inventory monitoring system 100, as embodied by the invention, comprises a modular design so expansion of the system's services and operation are readily achieved for another inventory management system 100 benefit. For example, plant management may only desire inventory pricing information. At a later date, the control unit 114 may be readily modified to provide at least one of shipping information, GPS capability, and transportation advisory information, thus enabling plant management to obtain more analyzed inventory information. Further, advances made in manufacturing sites, vendors, transportation, software, sensors, and other features of the inventory management system 100 are easily integrated into the inventory management system 100.

The inventory management system 100 is useable by plant management, as described above. The inventory management system 100, as embodied by the invention, is also controllable by a vendor 200 to provide further service to end users of its inventory. A vendor controlled inventory management system (hereinafter "vendor-managed inventory system"), as embodied by the invention, provides increased interaction between the manufacturing site 103 and vendors. A vendor 200, if allowed by a manufacturer, will be able to watch and predict inventory use at the manufacturing site 103, and deliver inventory 150 to the manufacturing site 103 without requiring a paper order from a purchasing agent through vendor managed inventory systems. For example, the order is placed, sometimes automatically, such as electronically. This process eliminates a middleman, frees up resources at the manufacturing site 103, and reduces delays and costs of ordering, since electronic communication is virtually instantaneous and inexpensive compared to paper communications. Also, this process increases inventory turn around by enabling a vendor 200 to ship inventory in desired amounts to maintain a steady manufacture rate to a manufacturing site when appropriate to replenish inventory. The inventory will be immediately useable by the manufacturing site 103, and will not be stored un-used for extended periods of time.

Another inventory management system 100 benefit arises from an interaction of a vendor 200 with the inventory management system 100 that permits the vendor 200 to check and confirm that an order, for example a paper order placed by a purchasing agent, is needed at the manufacturing site 103. The inventory management system 100 automates the inventory management process and reduces occurrences of incorrect orders. Also, "rush" orders (known in the industry as "hotsheets") will be avoided, as a vendor 200 will be able to discern when a manufacturing site actually needs an order. Returns of inventory orders will be reduced as inventory will be shipped only when a manufacturing site 103 actually needs inventory 150. This ordering method reduces standing inventory and increases inventory turn around for both the manufacturing site 103 and the vendor 200. The method is desirable to maintain associated inventory costs, such as, but not limited to, storage, shipping, and billing costs, at a minimum.

The inventory management system 100 further can also rely on appropriately developed inventory policy models to determine when is the most appropriate time to order inventory 150, for the benefit of another inventory management system 100. The models are incorporated into at least one of the control unit 114 and service center 175. The inventory policy model considers many factors, including but not limited to, further production plans, amount of inventory historically used, process capability of the processor 102, storage capability of the manufacturing site 103, and other such factors. For example, and in no way limiting of the invention, inventory orders would be increased if the inventory is used to produce polyvinylchloride piping for new housing construction and a manufacturing site 103 anticipates or has just obtained a large order due to the new housing starts. Conversely, inventory orders would be curtailed if new housing construction slowdowns were foreseen.

Also another benefit of the inventory management system 100 arises from its capacity of connecting to economic forecasting models, which provide information concerning the economy and predictions of further events. The economic forecasting models provide information that will be useful in estimating future manufacturing trends. The economic forecasting models will assist in the ordering of inventory to enable a manufacturing site 103 to follow estimations. For example, an economic forecasting model may predict that inventory prices will rise or fall due to various economic factors and external factors, such as weather that may affect housing starts and demands for the processed article (see the above example). This price information is useful to both the manufacturing site 103 and the vendor 200 for future plans. A vendor 200 with this analyzed information provided by the inventory management system 100 can pass on important information to its customers, and make itself a valuable partner in their business. This cooperation is desirable for many vendor-manufacturing site business relations, as both parties benefit from pricing and inventory analysis.

The inventory management system 100 enables location and identification of individual inventory orders at the manufacturing site 103, for example identification of a vendor's inventory at the manufacturing site 103. This inventory identification can use identifying codes, such as, but not limited to, bar codes. A transport vehicle 118 can have an identifying code associated with it when it leaves a vendor 200, and the same code is used throughout inventory lifetime to locate the inventory while enroute to the manufacturing site 103, in storage at the manufacturing site 103, in receptacles 104 at the manufacturing site 103, and being processed. Therefore, location and identification of inventory is readily accessible using the inventory management system 100.

Yet another benefit from the inventory management system 100 arises from its capability of permitting evaluation of products produced by the processor 102 dependent on the inventory shipment, also known as an inventory "lot". In silo 1104 of FIG. 1, the inventory 150 comprises two different lots. For example, lot 105 is from a different vendor than lot 107. Alternatively, the lots 105 and 107 may be from the same vendor, but different shipments. Since the amounts of lots 105 and 107 are known, as they were ordered through the inventory management system 100, the product's inventory and its source are known.

These lots may also be identified, as discussed above. If a product possesses a fault and the fault is determined to arise from the inventory, plant management can trace the inventory to a particular vendor. Therefore, corrective action can be taken. If the inventory management system 100 indicates that a particular vendor's inventory is historically faulty, such as, but not limited to, poor inventory quality or late deliveries, or the vendor is otherwise unsatisfactory, plant management can terminate the vendor 200. This vendor termination will increase productivity and quality of the manufacturing site 103, since high quality inventory will be properly controlled.

Figure 2:
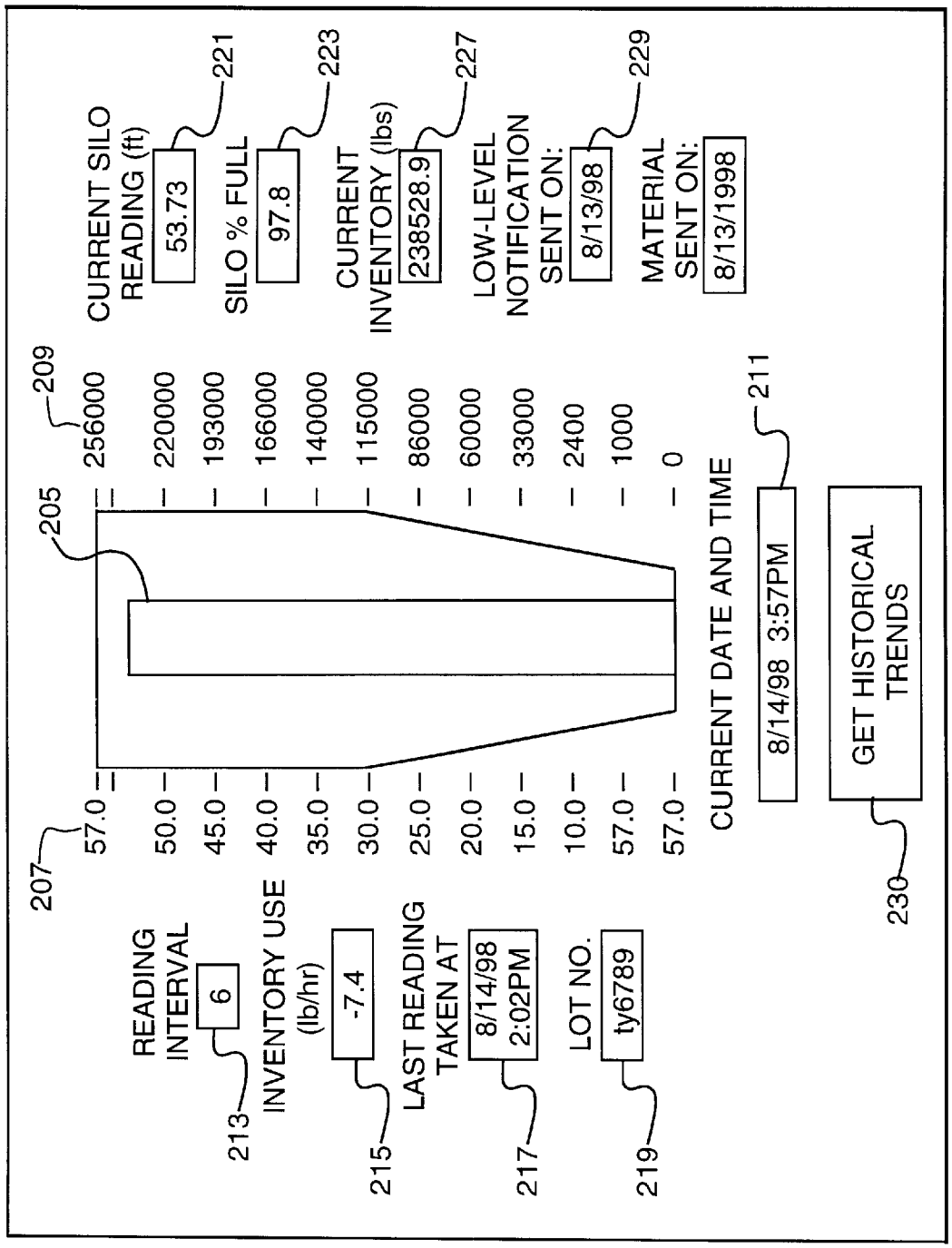
FIG. 2 is an illustration of a web page containing real-time analyzed silo information.
Figure 3:
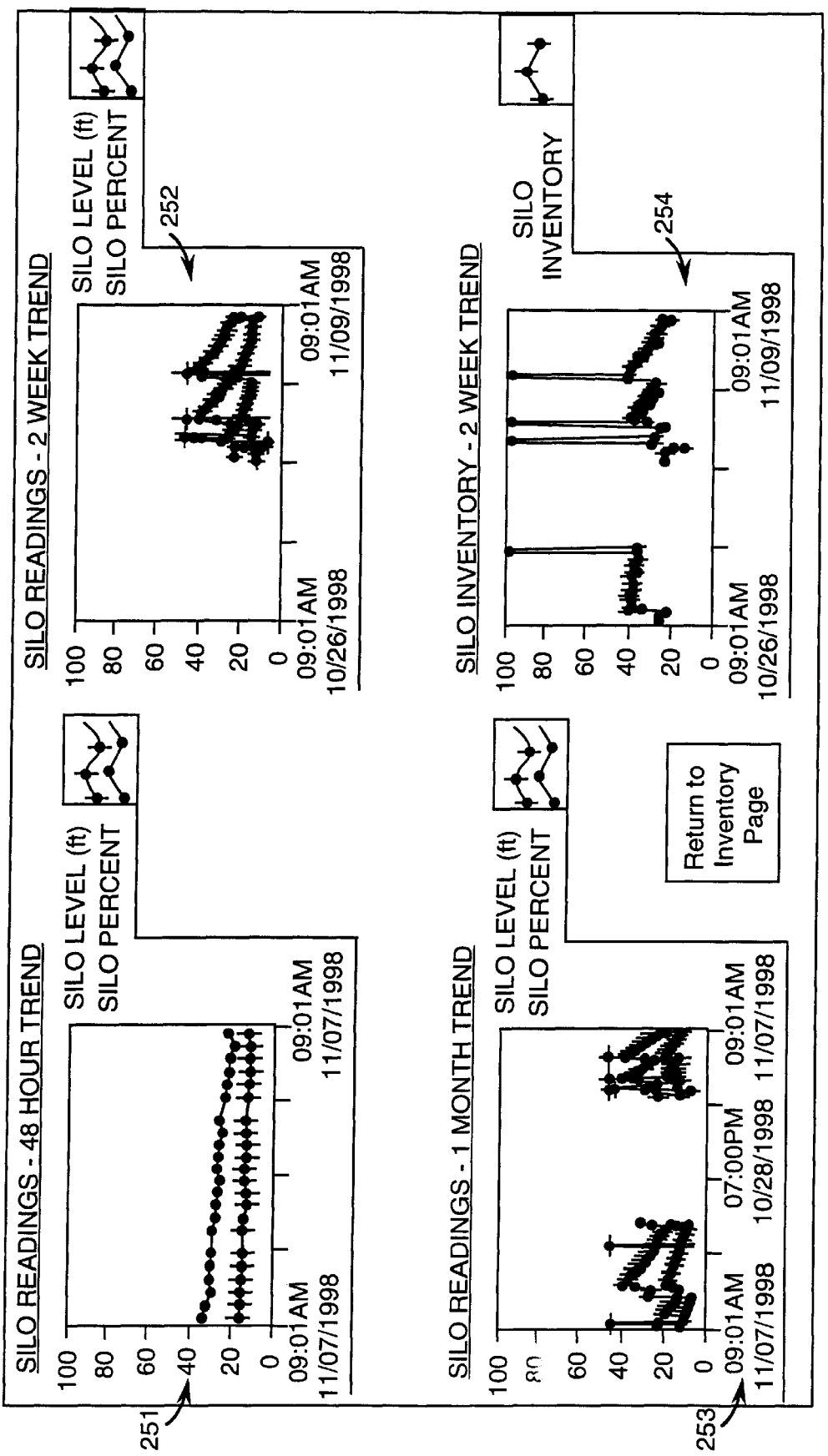
FIG. 3 is an illustration of a web page containing historical trend analyzed information for a receptacle at a manufacturing site.

The inventory management system 100 provides real-time, analyzed information concerning inventory in easily readable formats, including, but not limited to, formats accessible over the Internet, thereby providing a further inventory management system 100 benefit. Alternatively, the information can be accessible by voice mail, e-mail, telephone call, facsimile, Internet messages, pagers, and other appropriate communication modes. FIGS. 2 and 3 are illustrations of web pages containing analyzed information for a receptacle at a manufacturing site. In FIG. 2, an inventory web page shows real-time analyzed information for a receptacle. The receptacle is illustrated as a silo, however this is merely exemplary, and the receptacle can take any form and be illustrated in any way. In FIG. 2, the silo 204 is illustrated with its inventory amount schematically shown thereon by a bar 205. FIG. 2 also contains scales for indicating the quantity in the silo, for example a scale 207 that indicates real-time silo amounts in feet and a scale 209 that indicates real-time silo amounts in pounds.

FIG. 2 also indicates the date and time of the last reading at 217, where readings can be constantly updated to provide real-time information, at time periods and intervals determined by plant management. For example, and in no way limiting of the invention, readings can be taken every minute, 6 minutes (10 times an hour), every 10 minutes (6 times an hour), every 15 minutes (4 times an hour), every hour, and any other suitable and appropriate interval. The time interval can be automatically changed by the control unit 114 or the service center 175 in response to increases and decreases in usage. For example, the time interval can be changed based on a first derivative of a usage plot's slope.

Other instantaneous real-time data displays include, but are not limited to, a display for a reading interval or number of readings taken to this point at 213; a display for the real-time inventory use in lb/hr at 215; a current time display at 211; a display for the lot number or numbers in the silo at 219; a display for a realtime silo amount in feet at 221; a display for a real-time percent that the silo is full at 223; a display for a real-time silo amount by weight at 225; a display for an indication of a latest low-amount notification date at 227; and a display for a material shipped date at 229. These displays are merely exemplary, and the exact displays are determined to provide plant management and vendors with the highest degree of information needed and desired by them.

The web page in FIG. 2 also illustrates a button 230, such as, but not limited to, one of a hypertext link, image, hot link, and other such link (hereinafter "link"), for obtaining historical trend information. An inventory web page user clicks on the link and is transferred to a web page that illustrates historical trends, generated by the control unit 114 of the inventory management system 100, as embodied by the invention. FIG. 3 illustrates an exemplary design for a historical trend web page 250. The historical trend web page 250 includes various silo readings over periods of time. For example, and in no way limiting of the invention, the displays include historical silo feet, weight and percent trends over 48 hours, at 251, over 14 days, at 252, and over two month periods, at 253 and 254. The web page can also provide a "dashboard" that illustrates current realized savings as a result of using the inventory management system 100, as embodied by the invention versus prior historical trends and purchases.

The analyzed information generated by the inventory management system 100, as embodied by the invention, may be encrypted and stored for reference and library purposes. The information can be stored geographically separate form each other to avoid a loss of information.

While various embodiments are described herein, it will be appreciated from the specification that various combinations of elements, variations or improvements therein may be made by those skilled in the art, and are within the scope of the invention.

What is claimed is:

1. A network-based inventory management system that automatically provides information concerning inventory amounts and decides replacement inventory ordering, the system comprising a network-based machine-initiated and executed system comprising:

at least one storage receptacle that stores inventory;

at least one indicator that automatically determines an inventory amount in each receptacle, each indicator generating inventory amount signals representative of the inventory amount in the receptacle;

at least one inventory price source that provides inventory price information from at least one inventory vendor; and a control unit that receives the inventory amount signals from the indicator and inventory price information from the inventory price source, wherein the control unit automatically analyzes the inventory amount signals to determine inventory amounts in the receptacle, the control unit is capable of automatically integrating the inventory amounts and inventory price information to decide if an inventory order should be placed; and wherein the indicator, the inventory price source, and the control unit communicate with each other within a network.

2. A system according to claim 1, wherein the control unit comprises a computer.

3. A system according to claim 2, wherein the computer is capable of performing automatic data acquisition, data mining, and data analysis and the network is a computer-based network.

4. A system according to claim 1, wherein the at least one inventory price source provides inventory price information from a plurality of vendors, and the control unit is capable of determining a lowest total inventory purchase price from inventory prices of each inventory vendor and is capable of deciding if an inventory order should be placed based on the lowest total purchase price information.

5. A system according to claim 4, wherein total inventory purchase price comprises inventory price, and at least one of tariffs, taxes, and costs of transporting inventory from each respective vendor to a manufacturing site.

6. A system according to claim 1, wherein the control unit is capable of determining historical inventory price information, is capable of determining real-time inventory price information, is capable of estimating future inventory price information from the inventory price source, and is capable of analyzing at least one of the historical inventory price information, real-time inventory price information, and estimated future inventory price information to determine if an inventory order should be placed.

7. A system according to claim 1, wherein the inventory management system provides analyzed inventory information in a format accessible by at least one of a manufacturing site and inventory vendor to determine a schedule for replacement inventory.

8. A system according to claim 7, where the inventory information format comprises analyzed information that includes at least one of inventory quantity; inventory weight amounts; inventory readings as a function of time; inventory use; last reading information; inventory lot number information; receptacle volume information; receptacle volume percent information; low-amount notification information; and inventory shipment information.

9. A system according to claim 7, wherein the analyzed inventory information comprises real-time inventory information, estimated future inventory information, and historical inventory information.

10. A system according to claim 7, wherein the analyzed inventory information is accessible over the Internet, and the analyzed inventory information is capable of being communicated to an inventory vendor and manufacturing site by at least one of facsimile, Internet messages, pagers, regular mail, e-mail, voice mail, and telephone call.

11. A system according to claim 1, wherein the indicator comprises at least one of an ultrasonic amount detector, an ultrasound amount detector, an optical sensor amount indicator, a laser amount detector, a nuclear amount detector, and a load cell detector amount indicator, and combinations thereof.

12. A system according to claim 1, wherein the storage receptacle comprises at least one of a silo, storage bin, bag, warehouse, on-site transport vehicle, and hopper, and combinations thereof.

13. A system according to claim 1, further comprising a site controller, wherein the site controller is capable of receiving signals from each indicator and the site controller is capable of communicating the signals to the control unit.

14. A system according to claim 13, wherein the site controller comprises a solid state signal processor.

15. A system according to claim 1, further comprising at least one processor connected to a storage receptacle, the processor capable of forming a processed article from the inventory, and the control unit is capable of determining an inventory amount used by the processor.

16. A system according to claim 15, wherein the indicator is capable of providing inventory amounts in the receptacle over time, the control unit is capable of determining an inventory amount used in the processor by determining a difference in inventory amounts in the receptacle at two different times, is capable of determining estimated future inventory used based on the amount of inventory used by the processor, and is capable of determining if an inventory order should be placed based on estimated future inventory use.

17. A system according to claim 16, wherein the at least one inventory price source is capable of providing inventory price information from a plurality of inventory vendors, the control unit is capable of determining a lowest total inventory purchase price based on inventory prices of each inventory vendor and estimated future inventory use and is capable of determining if an inventory order should be placed based on the estimated future inventory use and the determination of lowest total purchase price information for each inventory vendor.

18. A system according to claim 1, further comprising at least one product information source that is capable of providing product pricing information concerning processed articles formed from the inventory, wherein the control unit is capable of determining estimated future production based on product pricing information, and is capable of determining if an inventory order should be placed based on the estimated future inventory use and estimated future inventory needs based on estimated future production.

19. A system according to claim 1, further comprising a shipping information source that comprises at least one of available transportation type information from an inventory vendor to a manufacturing site and transportation cost information, the shipping information source accessible by the control unit to provide the control unit with transportation type information for determining if an inventory order should be placed based on the estimated future inventory use and information from the shipping information source.

20. A system according to claim 1, further comprising transportation advisory source that provides transportation information, the transportation information comprises at least one of road condition information, rail condition information, water condition information, existing and possible delay information, construction along possible inventory order information, and weather information, the control unit is capable of determining the transportation information from the transportation advisory source, is capable of analyzing the transportation type information, and is capable of determining potential delays and an inventory shipment route that provides an expedited inventory order.

21. A system according to claim 20, the system further comprising a global positioning system that is capable of determining a location of inventory orders, and a communication link from the control unit to the inventory order, wherein the control unit is capable of accessing the global positioning system to determine a real-time location of the inventory order and where the control unit is capable of communicating with the inventory order to inform the inventory order of potential delays.

22. A system according to claim 1, further comprising a global positioning system that is capable of providing the control unit a location of inventory orders.

23. A system according to claim 1, further comprising a service center in communication with the control unit, the service center analyzing inventory amount signals and analyzed information, and the service center capable of performing statistical analysis of the inventory amount signals and analyzed information.

24. A system according to claim 23, the service center generates alerts in response to predetermined conditions, the predetermined conditions comprising shortages in inventory, inventory prices, and changes in economic indicators, wherein the alerts are sent to at least one of the manufacturing site and inventory vendor.

25. A system according to claim 1, the control unit generates alerts in response to at least one of predetermined conditions and analyzed information, the predetermined conditions comprise shortages in inventory, inventory prices, and changes in economic indicators, wherein the alerts are automatically sent by the control unit to at least one of the manufacturing site and inventory vendor.

26. A system according to claim 1, wherein the control unit identifies inventory by vendor.

27. A network-based inventory management method for providing information concerning inventory amounts and inventory ordering to at least one of a manufacturing site and an inventory vendor, the method comprising automatic steps that are machine-initiated and executed, the automatic steps comprising:

determining an inventory amount in each receptacle;

generating signals representative of inventory amounts;

providing inventory price information from at least one inventory source;

receiving inventory amount signals;

receiving inventory price information from the inventory price source;

analyzing inventory amount signals to determine inventory amounts in the receptacle and inventory price information;

integrating the inventory amounts and the inventory price information to decide if an inventory order should be placed; and providing information concerning an inventory order in accessible form to at least one of a manufacturing site and an inventory vendor;

wherein the automatic steps of determining, generating, providing, receiving, and integrating are performed by apparatuses that communicate with each other within a network.

28. A method according to claim 27, wherein the steps of receiving, analyzing, determining inventory amounts, and determining inventory orders is controlled by a computer.

29. A method according to claim 28, wherein the computer is capable of automatic data acquisition, data mining, and data analysis and wherein the network is a computer-based network.

30. A method according to claim 27, the method further comprises steps of automatically providing inventory price information for plurality of vendors, determining a lowest total inventory purchase price from inventory prices of each vendor, and deciding if an inventory order should be placed based on the determination of lowest total purchase price information.

31. A method according to claim 30, wherein the step of determining total inventory purchase price comprises determining a price of inventory and determining at least one of tariffs, taxes, and costs of transporting inventory from the vendor to the manufacturing site.

32. A method according to claim 27, the method further comprising steps of determining at least one of historical inventory price information, determining real-time inventory price information, and estimating future inventory price information, the method further comprises analyzing at least one of the historical inventory price information, real-time inventory price information, and estimated future inventory price information to determine if an inventory order should be placed.

33. A method according to claim 27, further comprising identifying inventory by vendor.

34. A method system according to claim 27, where the inventory information comprises at least one of real-time inventory information, estimated future inventory information, and inventory historical information.

35. A method according to claim 33, wherein the method further comprises:

accessing the analyzed information over the Internet;

and communicating the information to a vendor and manufacturing site by at least one of facsimile, Internet messages, pagers, regular mail, e-mail, voice mail, and telephone call.

36. A method according to claim 27, wherein the method further comprises determining inventory amount using at least one of an ultrasonic amount indicator, an ultrasound amount indicator, an optical sensor amount indicator, a laser amount indicator, a nuclear amount indicator, and a load cell detector amount indicator, and combinations thereof.

37. A method according to claim 27, further comprising employing a site controller that receives signals from each amount indicator, wherein the site controller communicates with other apparatuses within the network.

38. A method according to claim 27, wherein the method further comprises:

withdrawing inventory from the receptacle;

forming an article from the withdrawn inventory;

determining a difference in inventory amounts in the receptacle before and after said withdrawing, thereby determining an amount of inventory used by the processor;

determining an estimated future inventory use based on the amount of inventory used by the processor; and determining if an inventory order should be placed based on the estimated future inventory use.

39. A method according to claim 27, wherein the method further comprises:

determining a lowest total inventory purchase price from inventory prices of each vendor and estimated future inventory use; and determining if an inventory order should be placed based on the estimated future inventory use and the lowest total purchase price information for each vendor.

40. A method according to claim 27, wherein the method further comprises:

providing product pricing information concerning products formed from the inventory;

determining estimated future production based on product pricing information; and determining if an inventory order should be placed based on the estimated future inventory use and estimated future inventory needs based on estimated future production.

41. A method according to claim 27, wherein the method further comprises:

providing information concerning available types of transportation from a vendor to a manufacturing site and information concerning costs of transportation; and determining if an inventory order should be placed based on the estimated future inventory use and total inventory purchase price considering information from the shipping information source.

42. A method according to claim 27, wherein the method further comprises:

providing at least one of road condition information, rail condition information, water condition information, existing and possible delay information, construction along possible inventory order information, and weather information; and determining an inventory shipment route that provides expedited inventory order.

43. A method according to claim 42, wherein the method further comprises:

providing location of inventory orders; and determining a real-time location of the inventory order, and communicating possible potential delays to the inventory order.

44. A method according to claim 27, wherein the method further comprises analyzing inventory amount signals and information and performing statistical analysis of the inventory amount signals and information.

45. A method according to claim 27, wherein the method further comprises:
generating alerts in response to predetermined conditions, the predetermined conditions comprising shortages in inventory, low inventory prices, and changes in economic indicators; and
sending the alerts to at least one of the manufacturing site and vendor.

46. A network-based inventory management system for automatically providing information concerning inventory amounts and inventory ordering to at least one of manufacturing site and an inventory vendor, the system comprising a network-based machine-initiated and executed system comprising:
means for storing inventory;
means for determining an inventory amount in each means for storing inventory, the means for determining an inventory amount generating inventory amount signals representative of inventory amounts in the means for storing inventory;
means for providing inventory price information; and
means for receiving the inventory amount signals from the means for determining an inventory amount and inventory price information from the means for providing inventory price information,
wherein the means for receiving the inventory amount signals analyzes the inventory amount signals to determine inventory amounts in the means for storing inventory, the means for receiving the inventory amount signals analyzes the inventory amounts and inventory price information and the means for receiving the inventory amount signals determines if an inventory order should be placed, and
wherein means for storing, means for determining, means for providing, and means for receiving communicate with each other within a network.

47. A system according to claim 46, wherein the means for receiving the inventory amount signals comprises a computer.

48. A system according to claim 47, wherein the computer comprises at least one of data acquisition means, data mining means, and data analysis means.

49. A system according to claim 46, wherein the means for providing inventory price information provides inventory price information from a plurality of vendors, the wherein the means for receiving the inventory amount signals determines a lowest total inventory purchase price from inventory prices of each vendor and the means for receiving the inventory amount signals determines if an inventory order should be placed based on the determination of lowest total purchase price information.

50. A system according to claim 49, wherein total inventory purchase price comprises a price of inventory, and at least one of tariffs, taxes, and costs of transporting inventory from a vendor to the manufacturing site.

51. A system according to claim 46, wherein the means for receiving the inventory amount signals determines at least one of historical inventory price information, real-time inventory price information, and estimated future inventory price information, and the means for receiving the inventory amount signals considers at least one of historical inventory price information, real-time inventory price information, and estimated future inventory price information to determine if an inventory order should be placed.

52. A system according to claim 46, wherein the inventory management system provides analyzed inventory information format accessible by at least one of a manufacturing site and inventory vendor to determine a schedule for replacing the inventory.

53. A system according to claim 52, where the inventory information format comprises analyzed information comprising at least one of inventory quantity; inventory weight amounts; inventory readings as a function of time; inventory use; last reading information; inventory lot number information; means for storing inventory volume information; means for storing inventory volume percent information: low-amount notification information; and inventory shipment information.

54. A system according to claim 52, where the analyzed inventory information comprises at least one of real-time inventory information, estimated future inventory information, and historical inventory information.

55. A system according to claim 52, wherein the analyzed inventory information is accessible over the Internet, and is communicated to a vendor and manufacturing site by at least one of facsimile, Internet messages, pagers, regular mail, e-mail, voice mail, and telephone call.

56. A system according to claim 46, wherein the means for determining an inventory amount in each receptacle means comprises at least one of an ultrasonic amount detector, an ultrasound amount detector, an optical sensor amount indicator, a laser amount detector, a nuclear amount detector, and a load cell detector amount indicator, and combinations thereof.

57. A system according to claim 46, wherein the means for storing inventory comprises at least one of a silo, storage bin, bag, warehouse, on-site transport vehicle, and hopper, and combinations thereof.

58. A system according to claim 46, further comprising site controller means for receiving signals from each amount indicator, the site controller means communicating the signals to the means for receiving the inventory amount signals.

59. A system according to claim 58, wherein the site controller means comprises solid state signal processing means.

60. A system according to claim 46, further comprising means for forming a processed article from inventory connected to the means for storing inventory.

61. A system according to claim 60, wherein the means for determining an inventory amount provides inventory amounts in the means for storing inventory over time, the means for receiving the inventory amount signals determines an inventory amount used by the means for forming a processed article by determining a difference in inventory amounts in the means for storing inventory over time, the means for receiving the inventory amount signals determines estimated future inventory use based on the amount of inventory used by the means for forming a processed article, and the means for receiving the inventory amount signals determines if an inventory order should be placed based on the estimated future inventory use.

62. A system according to claim 61, wherein the means for providing inventory price information provides inventory price information from a plurality of vendors, the means for receiving the inventory amount signals determines a lowest total inventory purchase price based on inventory prices of each vendor and estimated future inventory use, and the means for receiving the inventory amount signals determines if an inventory order should be placed based on the estimated future inventory use and the determination of lowest total purchase price information for each vendor.

63. A system according to claim 46, further comprising product information source means for providing product pricing information concerning processed articles formed from the inventory, wherein the means for receiving the inventory amount signals determines estimated future production based on product pricing information, and the means for receiving the inventory amount signals determines if an inventory order should be placed based on the estimated future inventory use and future inventory needs based on estimated future production.

64. A system according to claim 46, further comprising shipping information source means for providing at least one of available transportation type information from a vendor to a manufacturing site and transportation cost information, the shipping information source accessible by the means for receiving the inventory amount signals to provide the means for receiving the inventory amount signals with transportation type information for determining if an inventory order should be placed based on the estimated future inventory use and information from the shipping information source.

65. A system according to claim 46, further comprising transportation advisory source means for providing at least one of road condition information, rail condition information, water condition information, existing and possible delay information, construction along possible inventory order information, and weather information, the means for receiving the inventory amount signals accessing information from the transportation advisory source means, analyzing the transportation type information and determining an inventory shipment route that provides expedited inventory order.

66. A system according to claim 65, further comprising global positioning means for providing location of inventory orders, and communication link means from the means for receiving the inventory amount signals to the inventory order, and the means for receiving the inventory amount signals accessing the global positioning means to determine a real-time location of the inventory order, and the means for receiving the inventory amount signals communicating with the inventory order to inform the inventory order of possible delays.

67. A system according to claim 46, further comprising global positioning means capable of providing the means for receiving the inventory amount signals to a location of inventory orders.

68. A system according to claim 46, further comprising a service center in communication with the means for receiving the inventory amount signals, the service center analyzing inventory amount signals and analyzed information and the service center performing statistical analysis of the inventory amount signals and information.

69. A system according to claim 68, wherein the service center generates alerts in response to predetermined conditions, the predetermined conditions comprise shortages in inventory, low inventory prices, and changes in economic indicators; the alerts are sent to at least one of the manufacturing site and vendor.

70. A system according to claim 46, wherein the means for receiving the inventory amount signals generates alerts in response to at least one of predetermined conditions and analyzed information, the predetermined conditions comprise shortages in inventory, low inventory prices, and changes in economic indicators; the alerts are automatically sent by the means for receiving the inventory amount signals to at least one of the manufacturing site and vendor.

71. A system according to claim 46, wherein the means for receiving the inventory amount signals identifies inventory by vendor.

* * * * *